(12) United States Patent
Bertelsen (10) Patent No.: US 8,105,035 B2
(45) Date of Patent: Jan. 31, 2012

(54) LIGHTNING PROTECTION SYSTEM FOR A WIND TURBINE ROTOR BLADE AND A METHOD FOR MANUFACTURING SUCH A BLADE

(75) Inventor: Kim Bertelsen, Ulfborg (DK)

(73) Assignee: Vestas Wind Systems A/S, Randers (DK)

( * ) Notice: Subject to any disclaimer, the term of this patent is extended or adjusted under 35 U.S.C. 154(b) by 532 days.

(21) Appl. No.: 12/267,259

(22) Filed: Nov. 7, 2008

(65) Prior Publication Data

US 2009/0056968 A1   Mar. 5, 2009

Related U.S. Application Data

(63) Continuation of application No. PCT/DK2007/000217, filed on May 8, 2007.

(30) Foreign Application Priority Data

May 9, 2006   (DK) .................................. 2006 00653

(51) Int. Cl.
*H02G 13/00*   (2006.01)
*F03D 11/00*   (2006.01)
(52) U.S. Cl. ................ 416/146 R; 416/224; 416/229 R; 416/230; 416/241 A; 29/889.7; 29/889.72; 29/897.3; 29/897.33
(58) Field of Classification Search .............. 416/146 R, 416/224, 229 R, 230, 241 A; 29/889.7, 889.72, 29/897.3, 897.33
See application file for complete search history.

(56) References Cited

U.S. PATENT DOCUMENTS

| 4,942,013 | A | * | 7/1990 | Palmer et al. ................. 264/511 |
| 5,304,339 | A | * | 4/1994 | Le Comte ..................... 264/511 |
| 5,665,301 | A | * | 9/1997 | Alanko ......................... 264/571 |
| 6,320,118 | B1 | * | 11/2001 | Pridham et al. ................... 174/2 |
| 6,457,943 | B1 | * | 10/2002 | Olsen et al. .................... 416/230 |
| 6,800,956 | B2 | | 10/2004 | Bartlett |

(Continued)

FOREIGN PATENT DOCUMENTS

DE           3836620 A1      5/1990
(Continued)

OTHER PUBLICATIONS

International Search Report and Written Opinion of the International Searching Authority, May 8, 2007 (15 pages).

*Primary Examiner* — Edward Look
*Assistant Examiner* — Jesse Prager
(74) *Attorney, Agent, or Firm* — Patterson & Sheridan, LLP (57) ABSTRACT

The invention relates to a wind turbine rotor blade comprising a blade tip and a lightning protection system. The rotor blade includes at least one lightning receptor at the surface of the blade in an external distance ($L_{ex}$) from the distal end of the blade tip, and a lightning receptor base inside the rotor blade arranged at an first internal distance ($L_{i1}$) from the distal end of the blade tip. The rotor blade further includes means for changing at least one electric property of the rotor blade at the lightning receptor base, as compared to the electric properties of the ambient air by increasing the electric field supported between the lightning receptor base and the inner surface of the rotor blade. The invention further relates to a method for manufacturing a wind turbine rotor blade.

28 Claims, 9 Drawing Sheets

U.S. PATENT DOCUMENTS

| | | | |
|---|---|---|---|
| 6,979,179 B2 * | 12/2005 | Møller Larsen | 416/223 R |
| 2004/0130842 A1 * | 7/2004 | Johansen et al. | 361/117 |

FOREIGN PATENT DOCUMENTS

| | | |
|---|---|---|
| EP | 1310351 A1 | 5/2003 |
| EP | 1561947 A2 | 8/2005 |
| FR | 2213871 A1 | 8/1974 |
| JP | 2005113735 A | 4/2005 |
| JP | 2007170268 A | 7/2007 |
| RU | 2133064 C1 | 7/1999 |
| WO | 9607825 A1 | 3/1996 |
| WO | 0014405 A1 | 3/2000 |
| WO | 0248546 A1 | 6/2002 |
| WO | 2005026538 A1 | 3/2005 |
| WO | 2005031158 A2 | 4/2005 |
| WO | 2005071261 A1 | 8/2005 |
| WO | 2005083863 A1 | 9/2005 |
| WO | 2007062659 A1 | 6/2007 |

* cited by examiner

Fig. 8

LIGHTNING PROTECTION SYSTEM FOR A WIND TURBINE ROTOR BLADE AND A METHOD FOR MANUFACTURING SUCH A BLADE

CROSS-REFERENCE TO RELATED APPLICATIONS

The present application is a continuation of pending International patent application PCT/DK2007/000217 filed on May 8, 2007 which designates the United States and claims priority from Danish patent application PA 2006 00653 filed on May 9, 2006, the content of which is incorporated herein by reference.

FIELD OF THE INVENTION

The present invention relates to a wind turbine rotor blade, comprising a blade tip and a lightning protection system, said blade including at least one lightning receptor at the surface of the blade in an external distance from the distal end of the blade tip, and a lightning receptor base inside the rotor blade arranged at a first internal distance from the distal end of the blade tip, and a method for manufacturing a wind turbine rotor blade.

BACKGROUND OF THE INVENTION

Lightning strikes against wind turbines has always been a problem needing attention because of damage to the wind turbine components reduces the operation time of the wind turbine and adds to the costs of operating the wind turbine.

The trend of modern wind turbine technology has been to build still larger wind turbines, which increase the wind turbines susceptibility to lightning strikes. The wind turbine rotor blades are the components of a wind turbine, which are in greatest risk of getting struck by lightning. Systems have been developed to protect wind turbine rotor blades against lightning strikes.

Some of these systems use current conducting metal layer on the surface of the wind turbine blade tips or even blade tips made in metal. The metal layer or metal tip is connected to the internal blade down conductor and subsequently a ground potential i.e. acting as an enlarged lightning receptor.

International patent application WO 2005/031158 discloses lightning protection means where the blade tip is partly or fully made in solid metal.

Other systems usually have one or more lightning receptors placed in the surface of the rotor blade connected to an internal blade down conductor, which provides a low impedance path to ground for the lightning to follow.

An example of such system is disclosed in international patent application WO 02/48546.

However, the lightning does not always strike the lightning receptors when striking the wind turbine rotor blade. Sometimes the lightning will hit and enter into the blade tip and form a path to ground by forming an arc between the blade surface and the down conductor, even though this path to ground is higher impendent, than if the lightning had struck the lightning receptor directly. The presence of the arc inside the rotor blade tip may cause severe damage to the rotor blade tip e.g. because of the significant increase in temperature in the confined space of the rotor blade tip.

It is therefore an object of the present invention to provide a wind turbine rotor blade without the drawbacks of well known lightning protection systems and especially to provide a wind turbine rotor blade with an improved lightning protection system in relation to internal arching.

Further it is an object of the present invention to provide an advantageous method of producing a wind turbine rotor blade according to the present invention.

SUMMARY OF THE INVENTION

The invention provides a wind turbine rotor blade comprising means for changing at least one electric property of the rotor blade at the lightning receptor base, as compared to the electric properties of the ambient air by increasing the electric field supported between the lightning receptor base and the inner surface of the rotor blade.

Hereby is obtained an improved lightning protection system for a wind turbine blade by changing the internal electric property. The limit value, when dielectric breakdown inside the rotor blade occurs, is substantially increased, thereby preventing internal arching When increasing the supported electric field between the lightning receptor base and the inner surface of the rotor blade, a much larger electric field is needed in order initiate a dielectric breakdown inside the rotor blade. By increasing the supported electric field to a size substantially larger than the electric field supported by atmospheric air, when used as internal isolation material, the ignition of an arc inside the rotor blade tip can be precluded and thus damage to the rotor blade tip.

By changing the internal electric property it is ensured that the lightning path will be outside the blade until a lightning receptor is reached and especially without establishing a protective metal cage on the surface of the blade.

By the term "lightning receptor base" is meant any means for electrically connecting one or more lightning receptors to a lightning down conductor.

The term "electric properties" should be understood as the resistivity, conductivity or dielectric strength.

By the term "ambient air" is meant atmospheric air at the wind turbine blade and in proximity of the point of lightning interception. The electric properties of the ambient air may vary with temperature, humidity, pressure etc. which may occur outside a wind turbine blade.

In an aspect of the present invention, an internal barrier is placed at a second internal distance from the distal end of the rotor blade, establishing a defined cavity from said internal barrier to the distal end of the blade tip.

Thereby the lightning receptor base is delimited in the tip end of the rotor blade from the remaining part of the rotor blade in a defined and closed cavity. Hence, several possible ways of increasing the dielectric strength of the isolating layer between the inner surface of the rotor blade and the lightning down conductor is enabled in the tip end of the rotor blade.

By the term "distal end" is meant the end of the rotor blade tip being furthest away from the root of the wind turbine rotor blade.

In another aspect of the present invention said means for changing at least one electric property of the rotor blade increases the electric field supported between the lightning receptor base and inner surface of the rotor blade. Hence, it is possible to increase the strength of the electric field supported between the inner surface of the rotor blade and the lightning receptor base, and thus preclude internal arching in case of a lightning strike.

In an aspect of the present invention, an internal barrier is placed at a second internal distance $L_{i2}$ from the distal end of the rotor blade, establishing a defined cavity from said internal barrier to the distal end of the blade tip.

In an aspect of the present invention, said defined cavity encases the lightning receptor base. Hereby it is possible to use the implant to correctly position the lightning receptor base in relation to the receptors inside the rotor blade.

In an aspect of the present invention, said lightning receptor base is embedded in an implant made for example in plastic or composite materials. Hereby, it is possible to establish an implant with the desired and precise shape in a mould. Further, it is possible and easy to position the lightning receptor base correctly within the implant.

In an aspect of the present invention, said implant is prefabricated with said lightning receptor base and means for connecting to one or more lightning receptors and a lightning down conductor. Hereby it is easy to establish the lightning protection system in the tip of the rotor blade.

In aspects of the present invention, said implant comprises a shape substantially corresponding to the inner of the blade tip e.g. a shark fin shape and with side openings for contact between said lightning receptor base and said receptors, and with elevations adapted to an inner surface of the blade. Hereby, it is possible to position the implant correctly and at the same time fill most of the inner volume of the blade tip.

In an aspect of the present invention, a lower barrier part of said implant is part of said internal barrier. Hereby, it is possible to position the implant correctly in relation to the receptors while establishing a closed cavity volume ready to be filled with a cavity material.

In an aspect of the present invention, said second internal distance is in the range between 0.2 meter to 2.0 meter and preferably between 0.2 meter to 0.6 meter from the distal end of the wind turbine rotor blade. Hereby lightning receptors in the blade surface could be placed in an adequate distance from the distal end of the rotor blade without increasing the probability for internal arching in case of a lightning strike in the distal end of the rotor blade.

In further aspects of the present invention, said means for increasing the supported electric field comprises a dielectric strength substantially larger than ambient air and with a dielectric strength larger than $1 \times 10^7$ V/m preferably in the range from $2 \times 10^7$ V/m to $8 \times 10^7$ V/m. Thereby adequate electrical isolation between the lightning receptor base and inner surface of the rotor blade is assured.

In yet another aspect of the present invention the volume of atmospheric air in the defined cavity is lower than 10% of the closed cavity volume, preferably lower than 3% of the closed cavity volume. If the material, filled into the closed cavity, is contaminated with a high content of bubbles of atmospheric air, the dielectric strength of the material is substantially lowered, whereby the protection against internal arching is substantially degraded, because arching can occur between the cavities.

In another aspect of the present invention, the remaining portion of atmospheric air inside the defined cavity is substantially homogenous distributed. An homogenous distribution of the remaining content of air bubbles inside the closed cavity preferably along the transition between the material filled into the cavity and the inner surface of the rotor blade, assures that the remaining air bubbles only provides a minor and predicable reduction in the protection of the wind turbine rotor blade.

In an aspect of the present invention, said means for increasing the supported electric field is a polyurethane material e.g. a two component non-expanding polyurethane material. This material has a high dielectric strength and therefore especially suitable for preventing internal arching inside the defined cavity.

In yet another aspect of the present invention, the blade tip is prefabricated as a separate part prior to attaching it to the wind turbine rotor blade e.g. as a unit for supplementary mounting to a blade in operation. Hereby another advantageous way to produce a blade tip according to the present invention is provided.

In an aspect of the present invention, said lightning receptor base is connected to an electrical ground potential. Hence, a low impedance path to ground is provided for the lightning to follow and thus an effective deflection of said lightning is provided.

In another aspect of the present invention, at least some of the lightning down conductor inside the rotor blade is isolated from the surroundings by a cover made in an electrically isolating material such as heat-shrink tubing in part or total length of the lightning down conductor. The isolation of the lightning down conductor parts inside the wind turbine rotor blade precludes internal arching between the lightning down conductor and other conductive parts inside the wind turbine rotor blade and thus damage to said conductive parts and any possible electrical circuits connected thereto.

In another aspect of the present invention, said lightning receptor base is housed in a prefabricated implant comprising means for connecting said lightning receptor base to one or more lightning receptors and an electrical ground connection. The prefabricated implant provides a foundation for the lightning receptor base inside the closed cavity, whereby an accurate placement of the lightning receptor base is enabled.

The invention also provides a method for manufacturing a wind turbine rotor blade where said method comprises the steps of:
- establishing at least two blade shells,
- placing a lightning receptor base with a connection to a lightning down conductor on one blade shell,
- establishing contact between at least one lightning receptor at the surface of the blade in an external distance $L_{ex}$ from the distal end of the blade tip and the lightning receptor base and between said at least two blade shells, and
- changing at least one electric property of the rotor blade at the lightning receptor base, as compared to the electric properties of ambient air by increasing the electric field supported between the lightning receptor base and the inner surface of the rotor blade.

BRIEF DESCRIPTION OF THE DRAWINGS

The invention will be described in the following with reference to the figures in which.

DETAILED DESCRIPTION OF THE INVENTION

Figure 1:
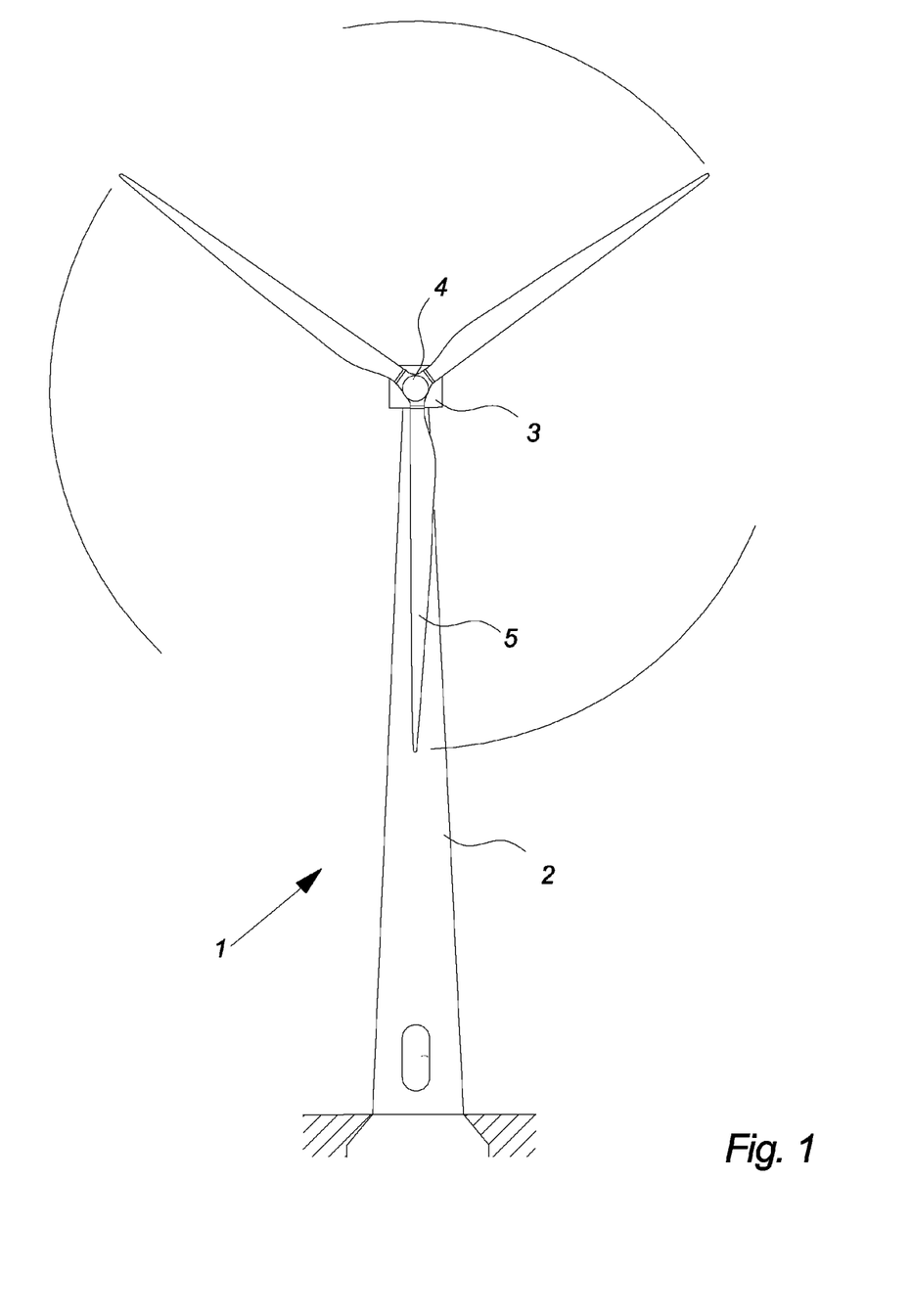
FIG. 1 illustrates a large modern wind turbine.

FIG. 1 illustrates a modern wind turbine 1. The wind turbine 1 comprises a tower 2 positioned on a foundation. A wind turbine nacelle 3 with a yaw mechanism is placed on top of the tower 2.

A low speed shaft extends out of the nacelle front and is connected with a wind turbine rotor through a wind turbine hub 4. The wind turbine rotor comprises at least one rotor blade e.g. three rotor blades 5 as illustrated. The rotor blades 5 may be pitchable in relation to the hub 4 by using pitch mechanisms or fixed mounted to the hub 4 as stall rotor blades.

The rotor blades 5 are hollow and thus having an outer surface and an inner surface.

Figure 2:
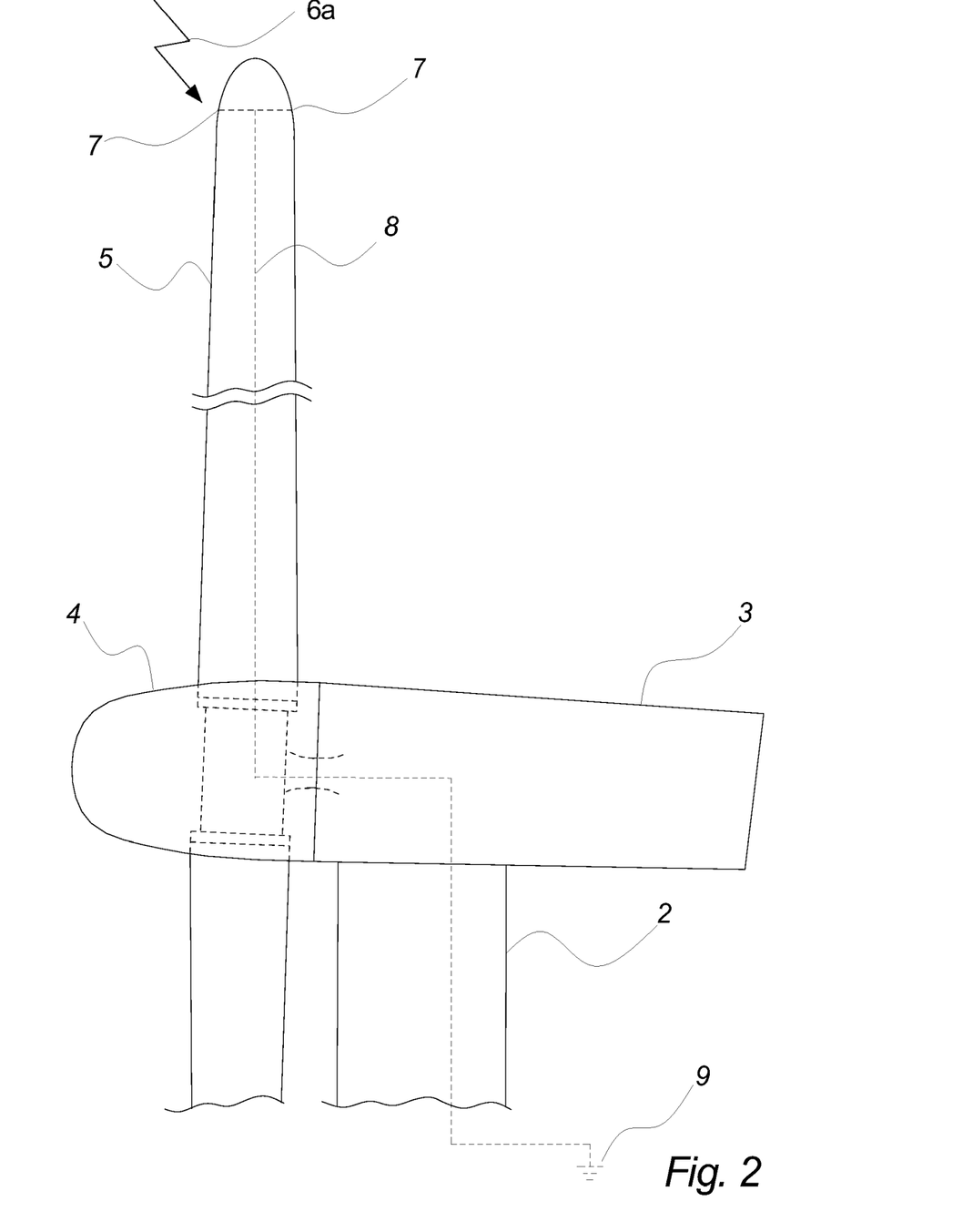
FIG. 2 illustrates a standard lightning protection system for a wind turbine rotor blade.

FIG. 2 illustrates a well known lightning protection system for a rotor blade 5 comprising one or more lightning receptors 7 made in a current conducting material. The receptors are arranged at the rotor blade outer surface and connected to a lightning down conductor 8 which provides a low impedance path to a ground connection 9.

In thunderstorms there is a large electric potential difference and thus a large electric field between the clouds and the earth surface because of a buildup of charges in the clouds. When the size of the electric field exceeds the dielectric strength of the air, the conditions for an electric discharge in form of a lightning strike is present. The large electric potential ionizes the air molecules and a dielectric breakdown occurs whereby the ionized air molecules becomes a conductor that carries away the excess charge of the electric field. In atmospheric air at standard temperature and pressure, this occurs for electric fields in the order of $3 \times 10^6$ V/m.

When the lightning 6a strikes a lightning receptor 7, the lightning 6a is deflected via the lightning down conductor 8 to the ground connection 9.

Figure 3:
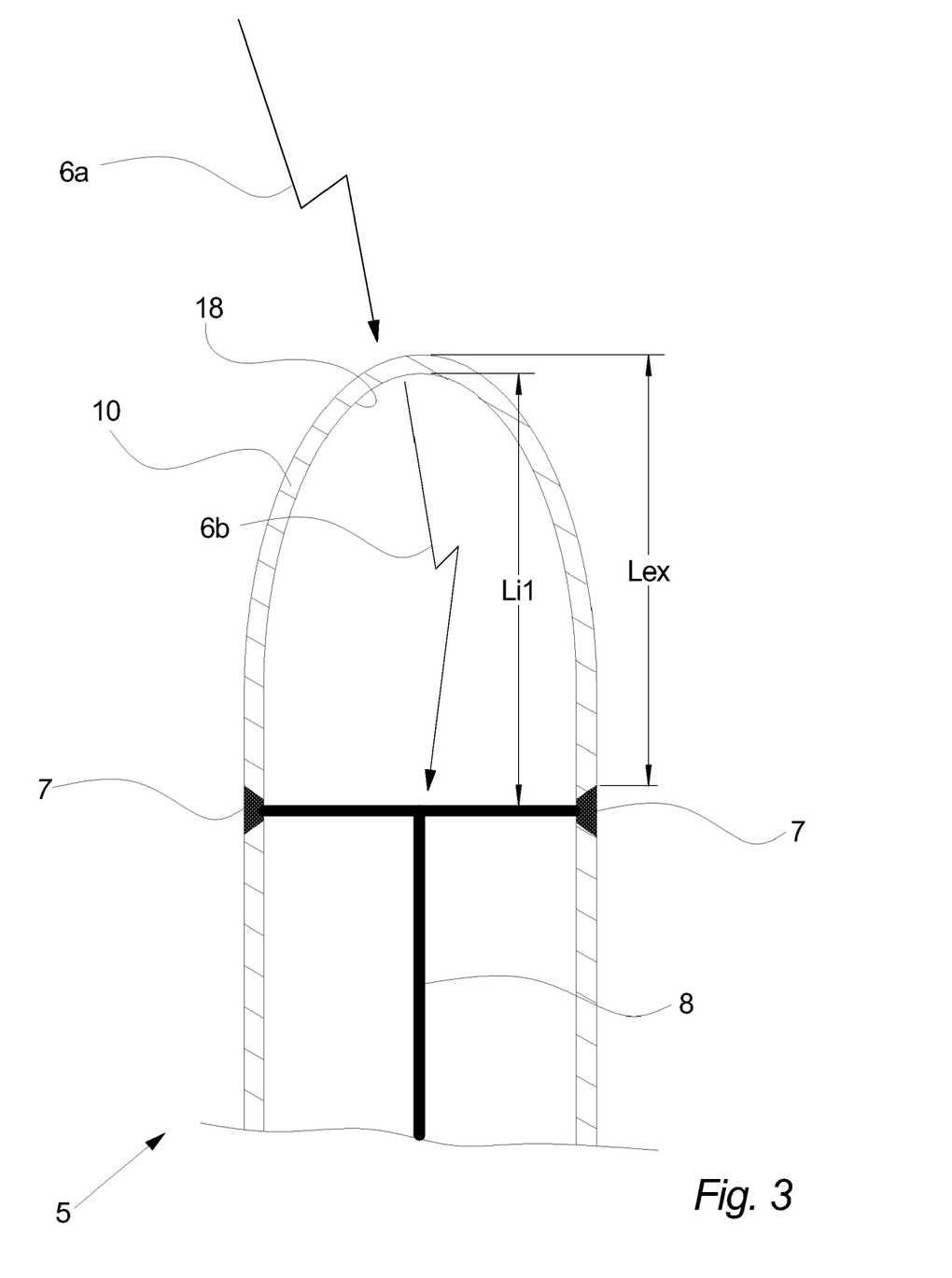
FIG. 3 illustrates the interior of a wind turbine rotor blade equipped with a lightning protection system and the problem of internal arching.

FIG. 3 illustrates the lightning protection system of FIG. 2 and especially what may happen when the lightning strikes the blade tip 10 instead of the lightning receptor 7.

The lightning 6a initially strikes the blade tip 10 of the rotor blade 5. An electric field builds up internally between the inner surface 18 of the rotor blade 5 and the down conductor 8, which is connected to the ground connection 9. When the size of this internal electric field exceeds the dielectric strength of the air between the inner surface 18 of the rotor blade 5 and the down conductor 8, wherein said air serves as an isolating media, an electrical conductive path is ionized between the inner surface 18 of the rotor blade 5 and the down conductor 8 and an arc 6b is ignited. Especially inside the confined space of the rotor blade tip 10, the ignition of the arc 6b can cause severe damage to the rotor blade 5.

Figure 4A:
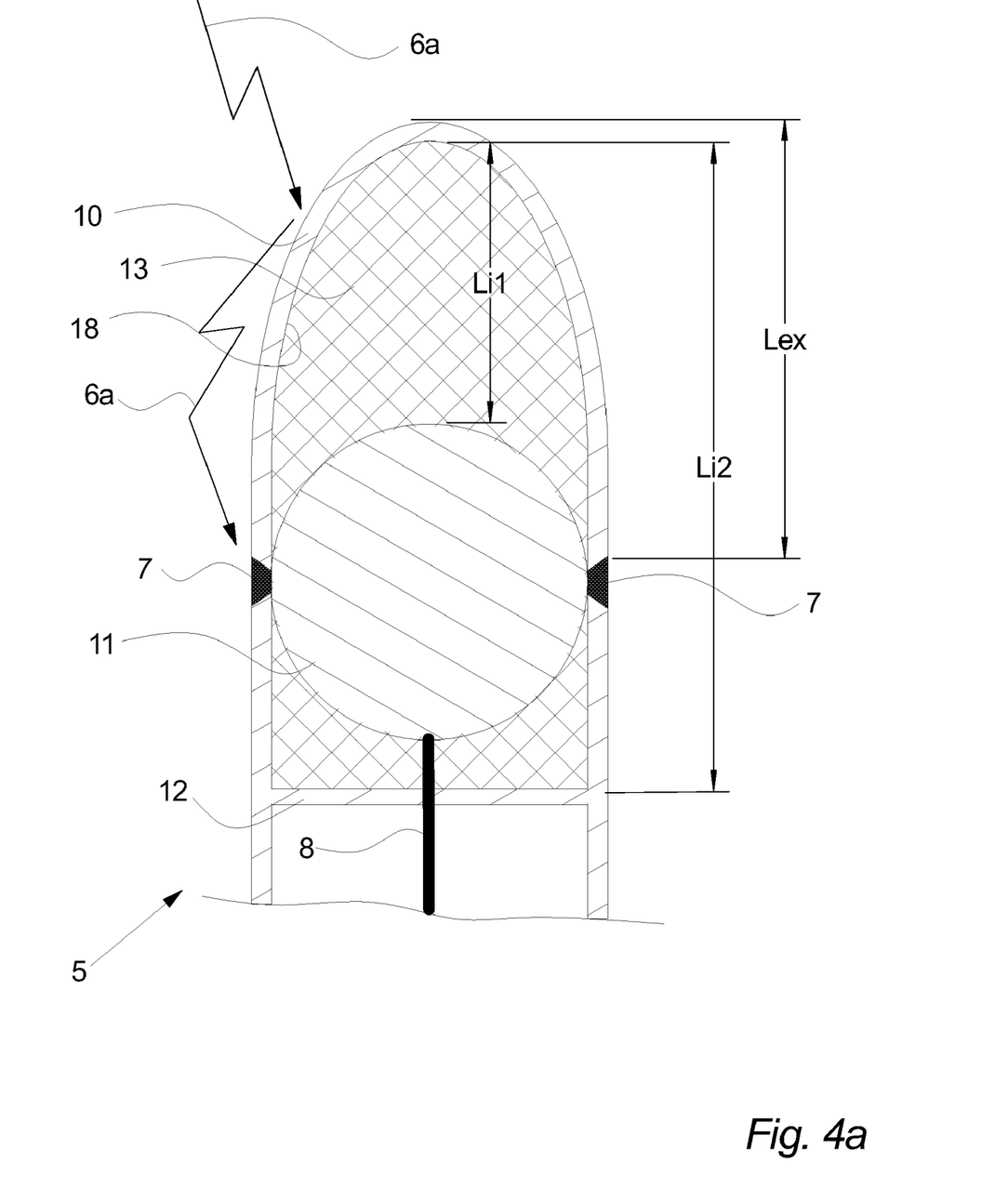
FIG. 4*a* illustrates schematically a first embodiment of a lightning protection system for a wind turbine rotor blade according to the present invention.

FIG. 4a illustrates the tip end of a wind turbine rotor blade 5 which is designed to avoid internal arching according to a first embodiment of the present invention.

The wind turbine rotor blade 5 comprises one or more lightning receptors 7 arranged at an external distance $L_{ex}$ from the distal end of the rotor blade 5. The lightning receptors 7 are connected to a lightning receptor base 11 made of a current conducting material. The base 11 is connected to the lightning down conductor 8 forming a low impedance path to ground connection 9 for the lightning current.

An internal barrier 12 is placed at a second internal distance $L_{i2}$ from the distal end of the rotor blade 5 forming a defined closed cavity 13, as indicated by the hatch, wherein the lightning receptor base 11 is placed. In order to preclude internal arching between the inner surface 18 of the rotor blade 5 and the lightning receptor base 11, and thus the down conductor 8, the closed cavity 13 is filled with a material 22a of a high dielectric strength. The high dielectric strength of the cavity filling material 22a ensures that an external path is established for the lightning 6a until a lightning receptor 7 is reached. The external path will have lower impedance in relation to the ground potential than an internal path from the strike point on the blade tip 10 through the cavity filling material 22a to the lightning receptor base 11.

The material 22a may in a preferred embodiment be two-component non-expanding polyurethane. An important property of the polyurethane material is its dielectric strength as it is desirable to support a large electric field between the lightning receptor base 11, and thus the down conductor 8, and the inner surface 18 of the rotor blade 5 without the occurrence of a dielectric breakdown.

In order to assure adequate electrical separation between the inner surface 18 of the rotor blade 5 and the lightning receptor base 11, it is preferred that the dielectric strength of the polyurethane material, or other dielectric materials filled into the cavity, is considerably larger than that of air at standard temperature, humidity and pressure. Advantageously the dielectric strength is at least $1 \times 10^7$ V/m preferably in the range from $2 \times 10^7$ V/m to $8 \times 10^7$ V/m.

As it is the dielectric property of the polyurethane material that is desired, other materials, like solids, fluids and gasses, with similar dielectric properties is within the scope of the present invention. An example of another material may be a silicone material.

Another important property of the preferred polyurethane material, or other suitable materials, is its substantially non-expanding properties, because it is preferred that idealistically all atmospheric air is expelled from the closed cavity 13. A higher content of atmospheric air in the cavity filling material 22a in form of e.g. bubbles or small cavities in the material could ruin the dielectric properties of the materials and thus the lightning protection of the blade tip 10 of the rotor blade 5.

Therefore it is preferred that the volume of atmospheric air bubbles in the closed cavity 13 comprises no more than 10% of the cavity volume preferably less than 3% of the cavity volume. Further it is preferred that any remaining bubbles of atmospheric air in the closed cavity 13 are homogenous distributed between the cavity filling material 22a and the inner surface 18 of the rotor blade 5.

The lightning receptor base 11 is illustrated in the figure as ball shaped. Round and continuous shapes are generally preferred in connection with high voltages in order to avoid arcs between edges. However, the lightning receptor base 11 may comprise a number of different shapes.

Figure 4B:
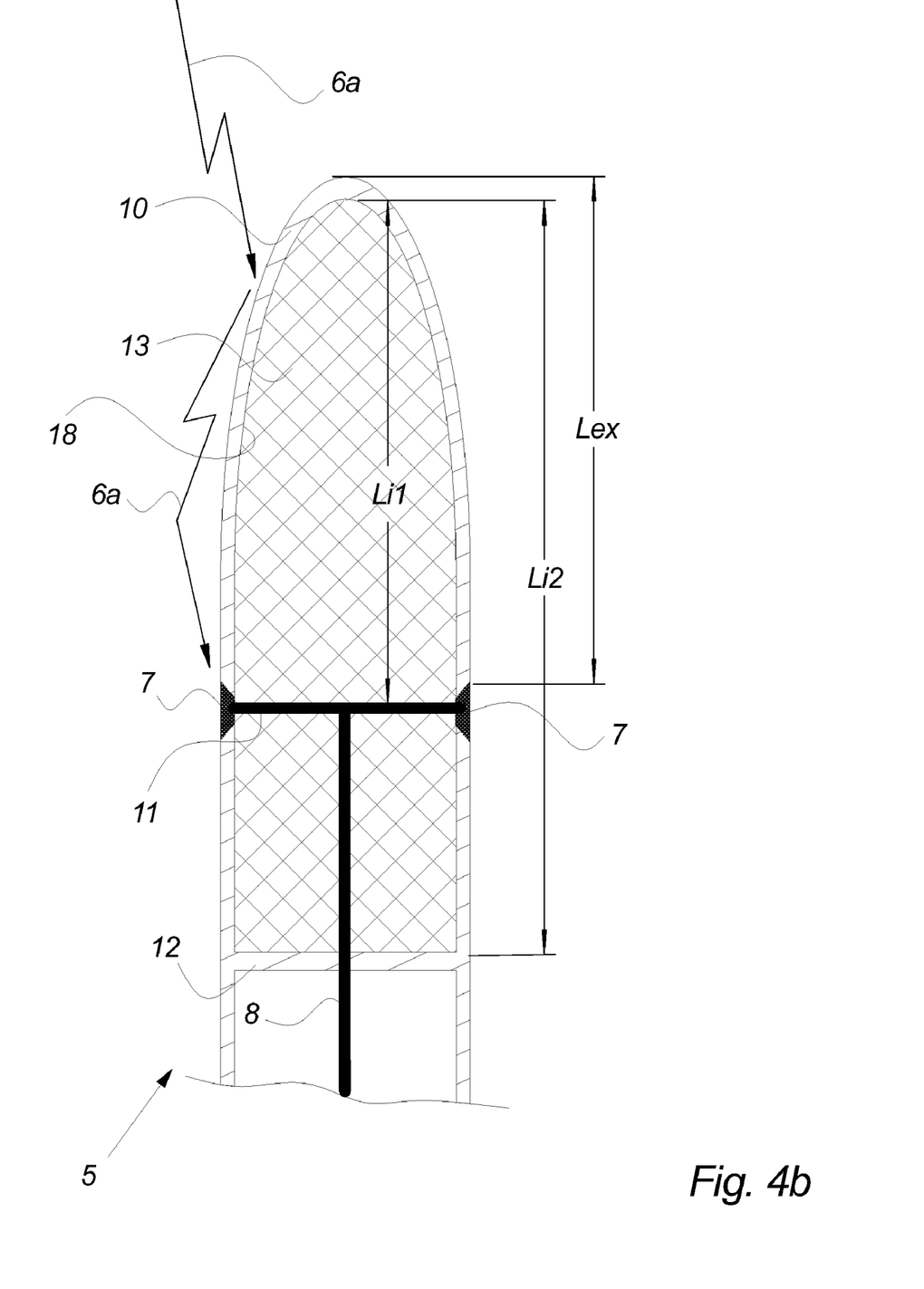
FIG. 4*b* illustrates schematically another embodiment of a lightning protection system for a wind turbine rotor blade according to the present invention.

FIG. 4b illustrates the tip end of a wind turbine rotor blade 5 which is designed to avoid internal arching according to another embodiment of the present invention.

For this embodiment the lightning receptors 7 are connected to a lightning receptor base 11 elaborated as a direct wire or rod or any similar electrical connection between said receptors 7. Further the lightning receptor base 11 is connected to the lightning down conductor 8 forming a low impedance path to ground connection 9 for the lightning current.

Figures 5A, 5B:
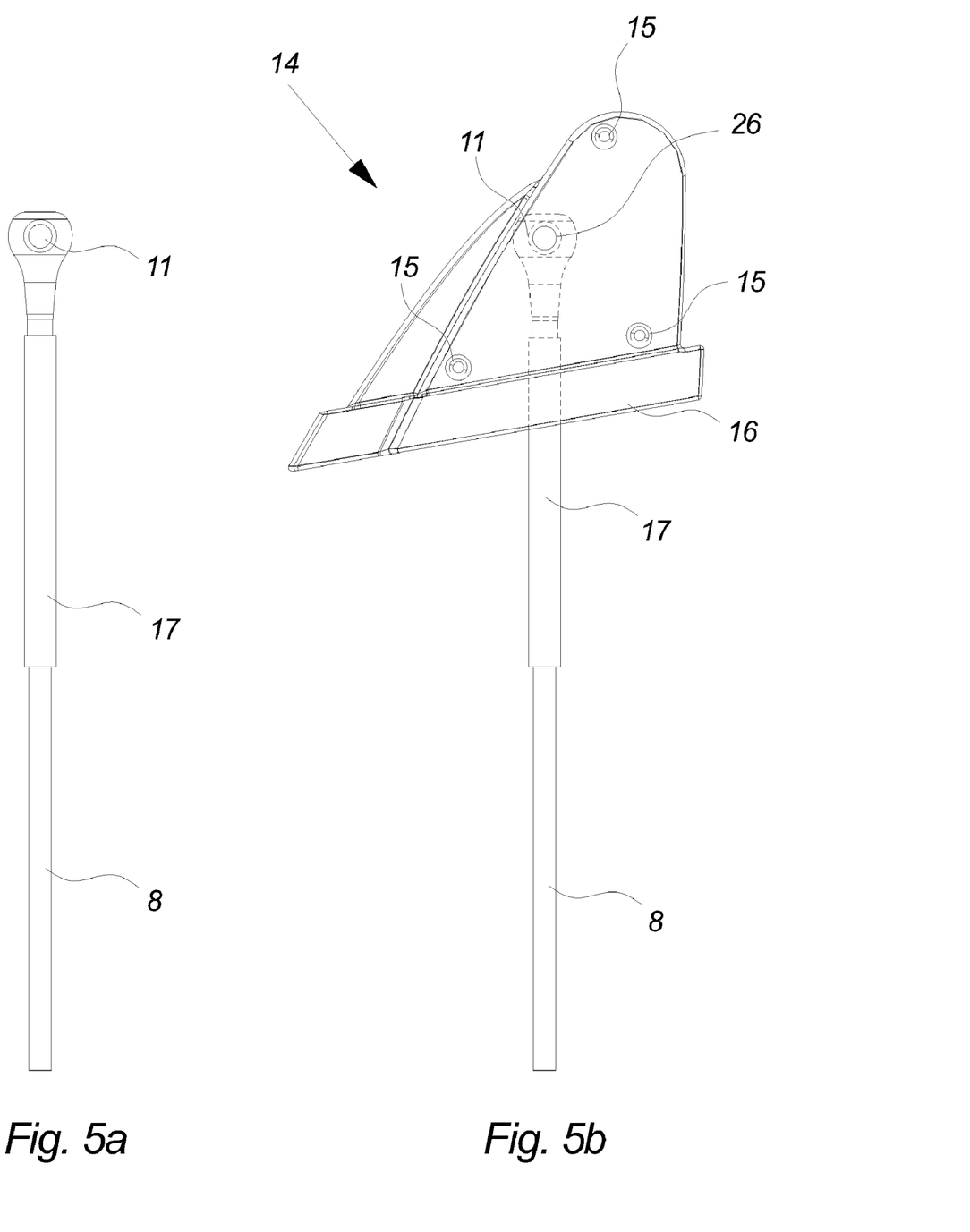
FIGS. 5*a* and 5*b* illustrate a preferred embodiment of a lightning protection system including a lightning receptor base embedded in an implant.

FIGS. 5a and 5b illustrate a preferred embodiment of a lightning protection system including a lightning receptor base 11 and an implant 14. The implant 14 is used to position the lightning receptor base 11 correctly inside the defined cavity 13 of the blade tip.

FIG. 5a illustrates the lightning down conductor 8 connected to a lightning receptor base 11 at the end of the conductor. The lightning receptor base 11 is illustrated in a preferred embodiment as comprising a round shape with two contact surfaces positioned on opposite side of the base.

The connection and a first part of the lightning down conductor 8 is provided with a cover 17 such as an external tube or an outer layer in an electrically isolating material, in order to preclude arching between the down conductor and other conductive parts of the wind turbine rotor blade 5. An adequate electrical isolation of the down conductor 8 and the internal conductive parts would be obtained with a material having a dielectric strength of at least $1 \times 10^7$ V/m preferably at least $2 \times 10^7$ V/m.

FIG. 5b illustrates the implant with the lightning receptor base 11 embedded and as seen from below.

The dotted line of the figure illustrates the part of the down conductor and lightning receptor base 11 which enters the implant.

The implant is preferably formed in a mould around the lightning receptor base 11 and the first part of the lightning down conductor 8 provided with a cover 17. The implant may be made in a plastic or composite material with a dielectric strength considerably larger than that of ambient air at standard temperature, humidity and pressure e.g. at T=20° C., RH=50%, P=1 atm. The dielectric strength of the implant material may for example have been tested with the use of the ASTM 149 or IEC 80243 standards.

The implant comprises a lower barrier part 16 that corresponds to the inner of the blade tip and with a wedge shape in the direction of the blade tip. The upper part of the implant is shark fin shaped in order to fit into and generally fill the defined cavity which is closed by the lower barrier part 16.

Both sides of the implant in the shark finned shape comprise an opening 26 which the lightning receptor base 11 may extend out of in order to make contact to the receptors 7 integrated in the rotor blade surface.

Figure 6:
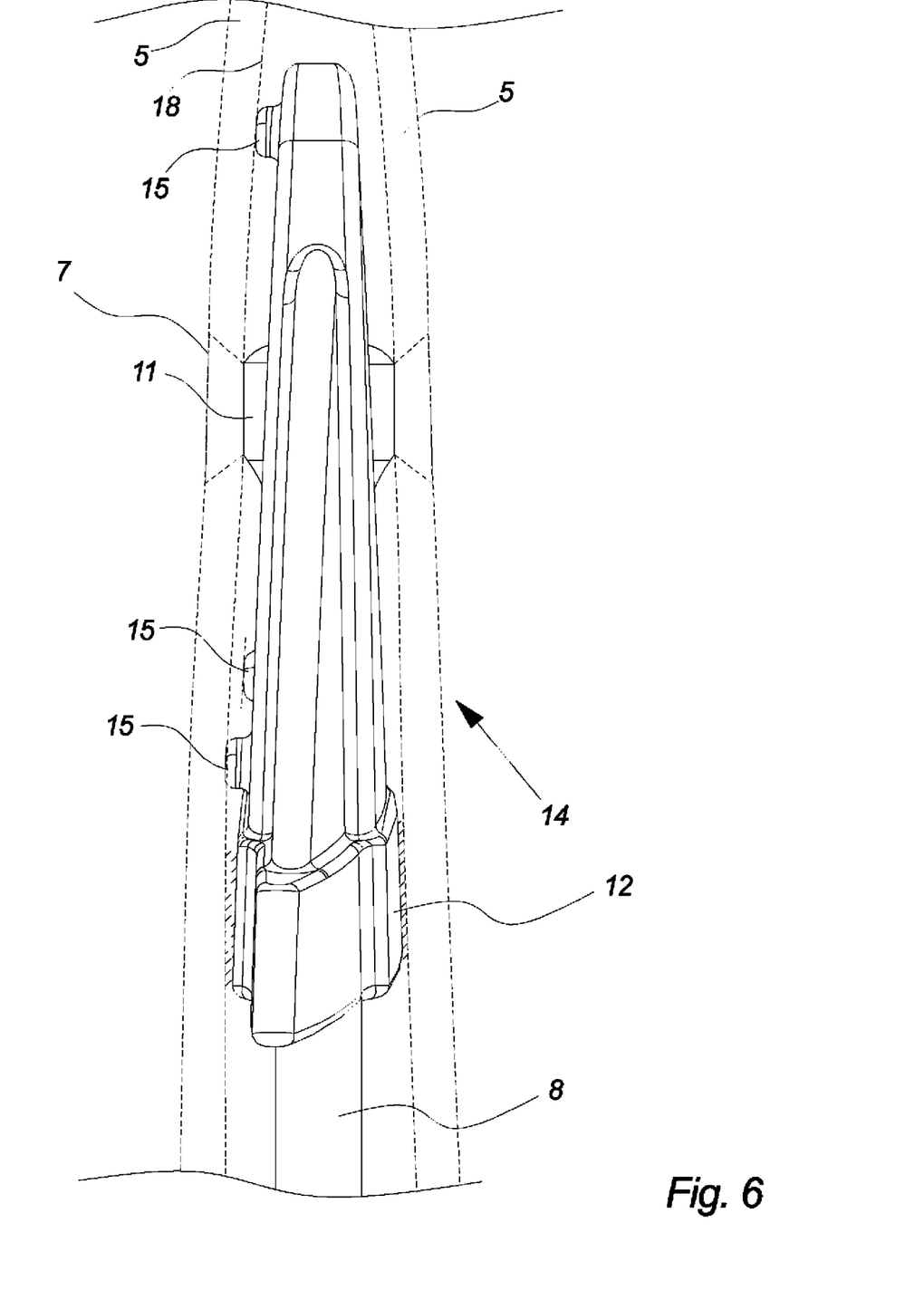
FIG. 6 illustrates the positioning of the implant in relation to the internal surface of a wind turbine blade.

One of the implant sides also comprises a number of elevations 15 in order to positioning the implant correct in relation to the inner blade surface 18 (as further illustrated in FIG. 6).

FIG. 6 illustrates schematically how the implant 14 of FIG. 5b is initially fixed in relation to the inner surface 18 of the rotor blade 5.

The inner surface is illustrated as a dotted line 18 on which the implant 14 is steadily positioned with the help of the elevations 15. Further, the elevations ensure a correct distance between the implant 14 and the surface 18 in such a way that the contact surface of the lightning receptor base 11 is in contact with the lightning receptors 7.

The cavity volume is ready to be filled with a cavity filling material 22a after the implant 14 is positioned and fixed to the inner surface 18 of the rotor blade 5 (as will be explained further below).

Figure 7:
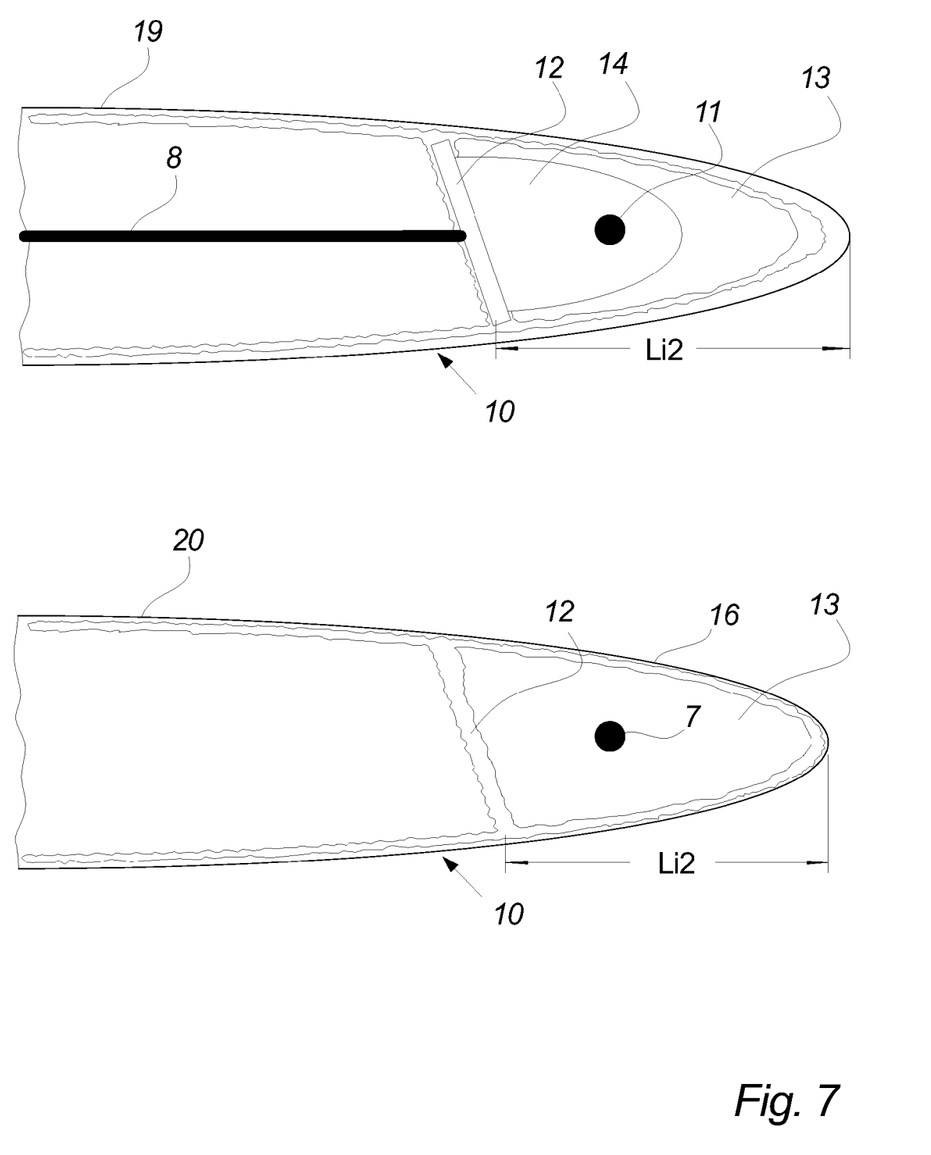
FIG. 7 illustrates two wind turbine rotor blade shells and the construction of a lightning protection system for a wind turbine rotor blade according to a preferred embodiment of the present invention.

FIG. 7 illustrates schematically the first steps in producing a rotor blade 5 according to a preferred embodiment of the present invention.

The rotor blade 5 comprises a first blade shell 19 and a second blade shell 20, when glued together forms the outer portion of the rotor blade 5.

First step in a preferred production method is to apply adhesive material along the leading and trailing edges of the first blade shell 19 and second blade shell 20.

Part of the adhesive material participates in establishing the internal barrier 12 by applying a sausage-shaped strip in the transverse direction of the first blade shell 19 and the second blade shell 20 at a second internal distance $L_{i2}$ form the distal end of the rotor blade 5.

In the second step the implant 14, prefabricated with the lightning receptor base 11 and lightning down conductor 8, is placed in the first blade shell 19 between the internal barrier 12 and the distal end of the first blade shell 19. The implant 14 is fixed to the inner surface by the elevations of the implant as well as the adhesive material.

The prefabricated implant 14 is used to stabilize the lightning receptor base 11 during the further production process.

Third step of the production process is to put the first blade shell 19 and the second blade shell 20 together, leaving a defined and closed cavity 13 between the two shells wherein the prefabricated implant 14 is situated and fixed.

Next step is to connect an inlet 21 for liquid cavity filling material 22b in a lower part of the blade 5. Further, an outlet 23 for liquid cavity filling material 22b is connected to the upper part of the defined and closed cavity 13.

Figure 8:
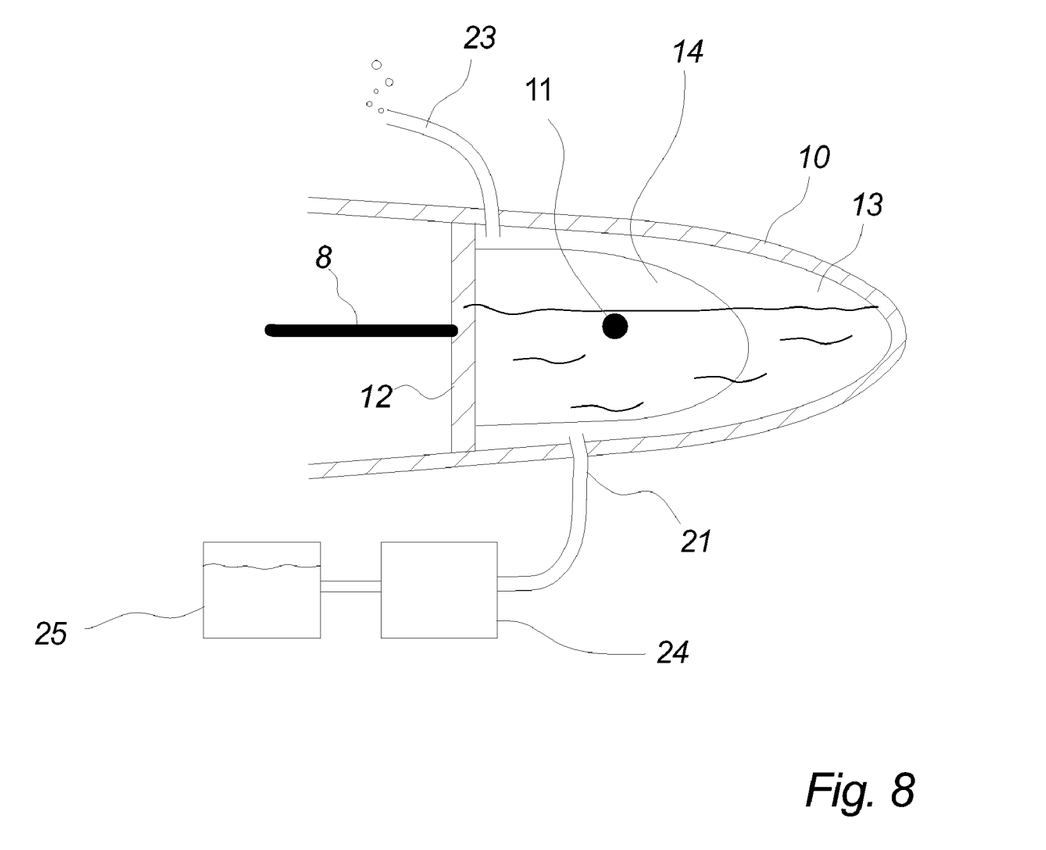
FIG. 8 illustrates a method of filling the cavity in the distal end of a wind turbine rotor blade with a liquid cavity filling material.

Thereafter the closed cavity 13 is then filled with a liquid cavity filling material 22b as illustrated schematically in FIG. 8 e.g. filled with a non-expanding polyurethane material.

FIG. 8 illustrates schematically a cross sectional view of the blade tip end 10 of a wind turbine rotor blade 5 according to a preferred embodiment of the present invention.

For the purpose of filling the closed cavity 13, the inlet 21 for a liquid cavity filling material 22b is placed at the bottom of the closed cavity 13 and the outlet 23 for a liquid cavity filling material 22b is placed at the top of the closed cavity 13.

A pump 24 or similar means is used to inject the liquid cavity filling material 22b from a reservoir 25 through the lower inlet 21, thereby expelling air from the closed cavity 13 through the upper outlet 23, until the cavity 13 is completely filled with the liquid cavity filling material 22b and substantially all air is expelled from the defined cavity 13.

After the defined cavity 13 is filled with the liquid cavity filling material 22b, heat may be applied to the outer surface of the blade tip 10 until the liquid cavity filling material 22b inside the defined cavity 13 is hardened. Finally the inlet 21 and the outlet 23 are removed and the final finish is applied to the surface of the tip 10.

Other cavity materials may be used such as inert gas under pressure e.g. sulfur hexafluoride ($SF_6$). Further, the electric field supported between the lightning receptor base 11 and the inner surface 18 of the rotor blade 5, may be increased by evacuating the air in the closed cavity 13 and thus creating a vacuum in the closed cavity. Advantageously the vacuum in the closed cavity 13 is maintained by means of an air pump or a similar device evacuating air from the closed cavity to a pressure lower than $2 \times 10^{-3}$ Pa.

Alternatively the wind turbine rotor blade according to the present invention may be manufactured in two parts with a separate blade tip comprising the lightning receptor base and at least one lightning receptor arranged at the surface of the blade tip.

The separate blade tip may be manufactured in a variety of different ways e.g. with an implant and a closed cavity which is filled with materials as mentioned above.

The invention has been exemplified above with reference to specific examples of a lightning protection system for a wind turbine. However, it should be understood that the invention is not limited to the particular examples described above but may be designed and altered in a multitude of varieties within the scope of the invention as specified in the claims.

What is claimed is:

1. A wind turbine rotor blade comprising:
   a blade tip;
   a barrier disposed inside of the blade, wherein the blade tip and the barrier bound a cavity within the blade, and wherein the barrier is disposed a first internal distance from a distal end of the blade tip;
   at least one lightning receptor disposed on an external surface of the blade at a distance from the distal end of the blade tip;
   a lightning receptor base coupled to the at least one lightning receptor and disposed inside the cavity, and arranged at a second internal distance from the distal end of the blade tip, the second internal distance being less than the first internal distance, and wherein at least a portion of a remainder of the cavity is filled with a dielectric material having a dielectric strength that is larger than air.

2. The wind turbine rotor blade according to claim 1, wherein said lightning receptor base is embedded in an implant made in plastic or composite materials.

3. The wind turbine rotor blade according to claim 2, further comprising a lightning down conductor.

4. The wind turbine rotor blade according to claim 2, wherein said implant comprises a shape substantially corresponding to the inner of the blade tip and with side openings for contact between said lightning receptor base and said receptors.

5. The wind turbine rotor blade according to claim 2, wherein said implant comprises elevations adapted to an inner surface of the blade.

6. The wind turbine rotor blade according to claim 2, wherein a lower barrier part of said implant is part of said barrier.

7. The wind turbine rotor blade according to claim 1, wherein said first internal distance is in the range between 0.1 and 2.0 meter from the distal end of the blade tip.

8. The wind turbine rotor blade according to claim 1, wherein the dielectric material has a dielectric strength larger than $1 \times 10^7$ Volt/meter.

9. The wind turbine rotor blade according to claim 1, wherein a volume of atmospheric air in the cavity is lower than 10 percent of a volume of the cavity.

10. The wind turbine rotor blade according to claim 1, wherein atmospheric air inside the cavity is substantially homogeneously distributed.

11. The wind turbine rotor blade according to claim 1, wherein said dielectric material is a polyurethane material.

12. The wind turbine rotor blade according to claim 1, wherein said lightning receptor base is connected to an electrical ground potential via a lightning down conductor.

13. The wind turbine rotor blade according to claim 12, wherein at least some of the lightning down conductor inside the rotor blade is isolated from the surroundings by a cover made in an electrically isolating material in part or total length of the lightning down conductor.

14. A wind turbine with a lightning protection system and at least one wind turbine rotor blade according to claim 1.

15. A method for manufacturing a wind turbine rotor blade where said method comprises:
   providing at least two blade shells enclosing a cavity,
   placing a lightning receptor base with a connection to a lightning down conductor on one blade shell,
   establishing contact between the lightning receptor base and at least one lightning receptor at the surface of the blade at a distance from a distal end of the blade tip and between said at least two blade shells, and
   filling at least a portion of the cavity with a dielectric material having a dielectric strength that is larger than air, thereby changing at least one electric property of the rotor blade at the lightning receptor base, as compared to the electric properties of ambient air, where at least one internal barrier is positioned in the distal end of at least one of the blade shells at an internal distance from the distal end of the blade tip.

16. The method for manufacturing a wind turbine rotor blade according to claim 15, where the lightning receptor base and the lightning down conductor are embedded in and connected by a prefabricated implant.

17. A method for manufacturing a wind turbine rotor blade, comprising:
   providing at least two blade shells,
   placing a lightning receptor base with a connection to a lightning down conductor on one blade shell,
   establishing contact between at least one lightning receptor at the surface of the blade in an external distance from a distal end of the blade tip and the lightning receptor base and between said at least two blade shells, and
   changing at least one electric property of the rotor blade at the lightning receptor base, as compared to the electric properties of ambient air by increasing the electric field supported between the lightning receptor base and the inner surface of the rotor blade, where the lightning receptor base and the lightning down conductor are embedded and connected in a prefabricated implant, where said prefabricated implant is adapted to an inner surface of the blade by elevations of the implant.

18. The method for manufacturing a wind turbine rotor blade according to claim 17, where a lower barrier part of said implant is used as part of an internal barrier.

19. The method for manufacturing a wind turbine rotor blade according to claim 15, where heat is applied in proximity of the blade.

20. The method for manufacturing a wind turbine rotor blade according to claim 15, where said dielectric material is filled into said cavity from a first position on the blade and said cavity is ventilated from a second position on the blade, the second position being relatively higher than the first position.

21. The wind turbine rotor blade according to claim 4, wherein said implant comprises a shark fin shape.

22. The wind turbine rotor blade according to claim 7 wherein said second internal distance is in the range between 0.2 meter to 0.6 meter from the distal end of the wind turbine rotor blade.

23. The wind turbine rotor blade according to claim 8 wherein said dielectric strength is in the range from $2 \times 10^7$ Volt/meter to $8 \times 10^7$ Volt/meter.

24. The wind turbine rotor blade according to claim 9 wherein the volume of atmospheric air is lower than 3 percent of a volume of the cavity.

25. The wind turbine rotor blade according to claim 11 wherein the polyurethane material is a two component non-expanding polyurethane material.

26. The wind turbine rotor blade according to claim 13 wherein said cover comprises heat-shrink tubing.

27. The method for manufacturing a wind turbine rotor blade according to claim 19, where heat is applied to an outer surface of the blade shells defining the wind turbine rotor blade.

28. The method for manufacturing a wind turbine rotor blade according to claim 20, where said dielectric material is filled into said cavity from a lowest position of said cavity and said cavity is ventilated from a highest position of said cavity.

* * * * *